US010190002B2

(12) United States Patent
Bohling et al.

(10) Patent No.: US 10,190,002 B2
(45) Date of Patent: Jan. 29, 2019

(54) AQUEOUS MULTI-STAGE EMULSION COPOLYMER COMPOSITIONS FOR USE IN JOINERY APPLICATIONS

(71) Applicant: Rohm and Haas Company, Philadelphia, PA (US)

(72) Inventors: James C. Bohling, Lansdale, PA (US); Jocelyn Gruver, North Wales, PA (US); Danniebelle Haase, New Castle, DE (US); Ann R. Hermes, Ambler, PA (US); Wenqin Wang, Phoenixville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 152 days.

(21) Appl. No.: 15/373,609

(22) Filed: Dec. 9, 2016

(65) Prior Publication Data
US 2017/0174905 A1    Jun. 22, 2017

Related U.S. Application Data

(60) Provisional application No. 62/269,152, filed on Dec. 18, 2015.

(51) Int. Cl.
| | |
|---|---|
| *C08K 3/00* | (2018.01) |
| *C09D 5/02* | (2006.01) |
| *C09D 133/08* | (2006.01) |
| *C08F 265/06* | (2006.01) |
| *C09D 151/00* | (2006.01) |
| *C08K 5/25* | (2006.01) |

(52) U.S. Cl.
CPC ............ *C09D 5/027* (2013.01); *C08F 265/06* (2013.01); *C09D 5/022* (2013.01); *C09D 133/08* (2013.01); *C09D 151/003* (2013.01); *C08K 5/25* (2013.01)

(58) Field of Classification Search
None
See application file for complete search history.

(56) References Cited

U.S. PATENT DOCUMENTS

| | | | | |
|---|---|---|---|---|
| 5,596,035 | A * | 1/1997 | Désor .................. | C08K 5/25 524/460 |
| 5,744,540 | A | 4/1998 | Baumstark et al. | |
| 5,962,571 | A | 10/1999 | Overbeek et al. | |
| 6,005,042 | A | 12/1999 | Desor et al. | |
| 6,515,042 | B2 | 2/2003 | Kriessmann et al. | |
| 6,538,062 | B2 | 3/2003 | Sakaguchi et al. | |
| 6,576,051 | B2 | 6/2003 | Bardman et al. | |
| 7,179,531 | B2 | 2/2007 | Brown et al. | |
| 7,285,590 | B2 * | 10/2007 | Holub .................. | C08F 2/001 523/201 |
| 7,820,754 | B2 * | 10/2010 | Betremieux .......... | C08F 2/22 524/556 |
| 8,440,766 | B2 * | 5/2013 | Rodrigues de Castro ................. | C08F 2/22 525/228 |
| 8,524,809 | B2 * | 9/2013 | Bohling ................ | C08F 6/006 435/135 |
| 8,546,482 | B2 * | 10/2013 | Bohling ................ | C08F 6/006 435/135 |
| 8,703,112 | B2 * | 4/2014 | Bohling ......... | C12Y 301/01003 424/78.09 |
| 9,102,848 | B2 * | 8/2015 | Hamilton ............. | C09D 133/26 |
| 9,115,265 | B2 * | 8/2015 | Yang .................... | C08K 5/20 |
| 9,303,161 | B2 * | 4/2016 | Bohling ................ | C08F 2/001 |
| 9,394,460 | B1 * | 7/2016 | Yang .................... | C09D 133/26 |
| 9,499,691 | B2 * | 11/2016 | Bohling ................ | C08F 2/001 |
| 9,951,169 | B2 * | 4/2018 | Yang .................... | C08F 265/06 |
| 2005/0107527 | A1 * | 5/2005 | Holub .................. | C08F 2/001 524/817 |
| 2009/0163619 | A1 | 6/2009 | Hsu et al. | |
| 2012/0058277 | A1 | 3/2012 | Bohling et al. | |
| 2012/0252972 | A1 | 10/2012 | Balk et al. | |
| 2015/0004420 | A1 | 1/2015 | Hill et al. | |
| 2015/0005446 | A1 * | 1/2015 | Bohling ................ | C08F 2/001 524/807 |
| 2016/0152817 | A1 * | 6/2016 | Bohling ................ | C08F 2/001 524/806 |
| 2017/0174905 | A1 * | 6/2017 | Bohling ................ | C09D 5/022 |

FOREIGN PATENT DOCUMENTS

| | | |
|---|---|---|
| EP | 0619341 A1 | 10/1994 |
| WO | 2009095569 A1 | 8/2009 |

* cited by examiner

*Primary Examiner* — Michael A Salvitti

(74) *Attorney, Agent, or Firm* — Karl E. Stauss; Cantor Colburn LLP

(57) ABSTRACT

The present invention provides aqueous compositions for use in coating wood joinery, especially for exterior use, comprising (a) one or more dihydrazide compounds in a total amount of from 0.5 to 4 wt. %, based on the total weight of composition solids and (b) of one or more aqueous multistage emulsion copolymers containing, as (i) a first stage, an emulsion copolymer having a glass transition temperature (Tg) via differential scanning calorimetry (DSC) of from −50 to 30° C., and containing, in copolymerized form one or more monoethylenically unsaturated phosphorous acid monomers and, one or more keto group containing amide monomers, and, as (ii) a second stage, an emulsion copolymer having a DSC Tg of at least 50° C. to 125° C., wherein the weight ratio of (i) the first stage to (ii) the second stage, based on copolymer solids, ranging from 50:50 to 90:10.

10 Claims, No Drawings

AQUEOUS MULTI-STAGE EMULSION COPOLYMER COMPOSITIONS FOR USE IN JOINERY APPLICATIONS

The present invention relates to aqueous coating compositions for wood and especially wooden joint coatings for exterior use comprising (a) one or more dihydrazide compounds and (b) one or more aqueous multistage emulsion copolymers containing a first stage polymer having a glass transition temperature (Tg) via differential scanning calorimetry (DSC) of from −50 to 30° C., wherein the first stage polymer contains, in copolymerized form one or more phosphorous acid monomers and one or more keto group containing amide monomers and a second stage polymer having a DSC Tg of from 45 to 150° C. higher than the DSC Tg of the first stage polymer, as well as to wood coatings made therefrom.

Wood joinery polymers are required to have excellent water resistance, but also low volatile organic compound (VOC) contents, balanced with low temperature film formation, good block resistance, fast hardness development, good exterior durability, good hiding and gloss. This combination of needs has proven difficult to meet.

As is known in the art, polymer particles containing phosphorous acid monomers can form $TiO_2$ or pigment and polymer composites wherein the polymer adsorbs onto the $TiO_2$ or pigment surface. The formation of polymer-$TiO_2$ composites offers many performance advantages, such as improved hiding, and higher gloss. However, the hydrophilic nature of acid monomers tends to cause water sensitivity issues in coatings, resulting in poor water resistance, and, subsequently, problems with wet adhesion and gloss retention under high humidity conditions during outdoor exposure or accelerated QUV testing.

U.S. Pat. No. 7,285,590, to Holub et al. discloses an aqueous multistage hard-soft polymer dispersion composition for use in making coatings with improved block resistance at low VOC level. However, the compositions in the reference where a hard polymer stage is polymerized first to make the aqueous multistage copolymer dispersions fail to provide acceptable film formation properties in a coating composition having a VOC content of 100 g/L or less.

The present inventors have endeavored to provide compositions for making coatings for wood, especially wood substrates made from multiple pieces of wood joined together, e.g. window and door frames, with an improved balance of low temperature film formation, block resistance, hardness development, exterior durability, hiding and gloss properties at a VOC content of 100 g/L or less.

STATEMENT OF THE INVENTION

1. The present invention provides aqueous multistage emulsion copolymer compositions comprising (a) one or more dihydrazide compounds in a total amount of from 0.5 to 4 wt. % or, preferably, from 1 to 3 wt. %, based on the total weight of composition solids, and (b) of one or more aqueous multistage emulsion copolymers containing, as (i) a first stage, an emulsion copolymer having a glass transition temperature (Tg) via differential scanning calorimetry (DSC) of from −50 to 30° C., or, preferably, from −30 to 20° C. and containing, in copolymerized form, from 0.5 to 5.0 wt. %, or, preferably, from 1 to 3.5 wt. %, of one or more monoethylenically unsaturated phosphorous acid monomers and, from 0.75 to 5 wt. % or, preferably, from 1 to 3 wt. % of one or more keto group containing amide monomers, such as, for example, diacetone acrylamide (DAAM) or diacetone methacrylamide, all monomer weights based on the total weights of monomers used to make the first stage, and, as (ii) a second stage, an emulsion copolymer having a DSC Tg of from 50° C. to 125° C., preferably, from 60° C. to 115° C., wherein the Tg difference between the first stage and the second stage is from 45° C. to 150° C. or, preferably, at least 60° C., and having a weight ratio of (i) the first stage to (ii) the second stage, based on copolymer solids, ranging from 50:50 to 90:10 or, preferably, from 60:40 to 80:20, all monomer wt. % s based on the total weight of monomers used to make the aqueous multistage emulsion copolymer, and, further wherein, the (ii) second stage of the aqueous multistage emulsion copolymer comprises, in copolymerized form, no more than 25 wt. %, or, preferably, no more than 10 wt. % of the total monoethylenically unsaturated phosphorous acid monomers used to make the aqueous multistage emulsion copolymer, and no more than 50 wt. %, or, preferably, no more than 25 wt. % of the total keto group containing amide monomers used to make the aqueous multistage emulsion copolymer.

2. The aqueous multistage emulsion copolymer composition as in item 1, above, wherein (b) at least one of the one or more aqueous multistage emulsion copolymers comprise, in copolymerized form, at least 90 wt. %, or, preferably, at least 98 wt. %, or, more preferably, all of the one or more monoethylenically unsaturated phosphorous acid monomers used to make the aqueous multistage emulsion copolymer in the (i) first stage.

3. The aqueous multistage emulsion copolymer composition as in any one of items 1 or 2, above, wherein (b) the at least one of the aqueous multistage emulsion copolymers comprise in the (i) first stage, in copolymerized form, from 0.05 to 1.5 wt. %, or, preferably, from 0.1 to 1.0 wt. % of one or more ethylenically unsaturated acid monomers, such as, for example, carboxylic acid or sulfur acid monomers, or their salts, preferably, acrylic acid, methacrylic acid or 4-vinylbenzenesulfonic acid.

4. The aqueous multistage emulsion copolymer composition as in any one of items 1, 2, or 3, above, wherein the one or more monoethylenically unsaturated phosphorus acid monomers in the (i) first stage is chosen from dihydrogen phosphate-functional monomers, such as dihydrogen phosphate esters of an alcohol in which the alcohol also contains a polymerizable vinyl or olefinic group, such as allyl phosphate, mono- or diphosphate of bis(hydroxymethyl) fumarate or itaconate; phosphorus acid containing (meth)acrylic acid esters, such as, for example, phosphates of hydroxyalkyl(meth)acrylates including 2-hydroxyethyl (meth)acrylate and 3-hydroxypropyl (meth)acrylates, and, preferably dihydrogen phosphate monomers, such as, 2-phosphoethyl (meth)acrylate, 2-phosphopropyl (meth)acrylate, 3-phosphopropyl (meth)acrylate, and 3-phospho-2-hydroxypropyl (meth)acrylate; monoethylenically unsaturated phosphonate-functional monomers, such as vinyl phosphonic acid, allyl phosphonic acid, 2-acrylamido-2-methylpropanephosphonic acid, alpha-phosphonostyrene, 2-methylacrylamido-2-methylpropanephosphonic acid; and 1,2-ethylenically unsaturated (hydroxy)phosphinylalkyl (meth)acrylate monomers, such as (hydroxy)phosphinylmethyl methacrylate.

5. The aqueous multistage emulsion copolymer composition as in any one of items 1, 2, 3, or 4, above, wherein (a) the one or more dihydrazide compound is a compound of the formula $H_2NHN$—X—$NHNH_2$, wherein X represents a —CO-A-CO— group, A represents a $C_1$ to $C_{12}$ alkylene group or a $C_6$ to $C_{12}$ arylene group, preferably, a $C_1$ to $C_8$ alkylene group, and the "—" represents a covalent bond, preferably, an adipic dihydrazide.

6. The aqueous multistage emulsion copolymer composition as in any one of items 1, 2, 3, 4, or 5, above, for example, a coating composition, which has a total volatile organic compound (VOC) content of 150 g/L or less, or, preferably, 100 g/L or less.

7. The present invention provides methods of making aqueous multistage emulsion copolymer compositions comprising aqueous emulsion polymerizing by gradual addition in the presence of an initiator or a redox pair from 50 to 90 weight parts, or, preferably, from 60 to 80 weight parts, based on 100 parts total monomer solids used to make the multistage emulsion copolymer, of a first monomer mixture containing from 0.5 to 5.0 wt. %, or, preferably, from 1 to 3.5 wt. %, of one or more monoethylenically unsaturated phosphorous acid monomers and, from 0.75 to 5 wt. % or, preferably, from 1 to 3 wt. % of one or more keto group containing amide monomers, such as, for example, diacetone acrylamide (DAAM) or diacetone methacrylamide, all monomer weights based on the total monomer solids used to make the multistage emulsion copolymer and the remainder of nonionic monomers including one or more soft monomers to form (i) a first stage aqueous emulsion copolymer having a glass transition temperature (Tg) via differential scanning calorimetry (DSC) of from −50 to 30° C., or, preferably, from −30 to 20° C. and, sequentially aqueous emulsion polymerizing by gradual addition in the presence of the (i) first stage aqueous emulsion copolymer and an initiator or a redox pair from 10 to 50 weight parts, or, preferably, from 20 to 40 parts, based on 100 parts of total monomer solids used to make the multistage emulsion copolymer, of a second monomer mixture containing one or more nonionic monomers including each of one or more soft monomers and one or more hard vinyl monomers to form an aqueous multistage emulsion copolymer having (ii) a second stage emulsion copolymer with a DSC Tg of from 50° C. to 125° C., preferably, from 60° C. to 115° C., wherein the Tg difference between the first stage and the second stage is from 45° C. to 150° C. or, preferably, at least 60° C., and wherein the weight ratio of (i) the first stage to (ii) the second stage, based on copolymer solids, ranges from 50:50 to 90:10 or, preferably, from 60:40 to 80:20, and, further wherein, the (ii) second stage of the aqueous multistage emulsion copolymer comprises, in copolymerized form, no more than 25 wt. %, or, preferably, no more than 10 wt. % solids of the total monoethylenically unsaturated phosphorous acid monomers used to make the aqueous multistage emulsion copolymer, and less than 50 wt. %, or, preferably, no more than 25 wt. %, or, more preferably, no more than 15 wt. % solids of the total keto group containing amide monomers used to make the aqueous multistage emulsion copolymer, and, then, formulating the thus formed aqueous multistage emulsion copolymer with one or more dihydrazide compounds in a total amount of from 0.5 to 4 wt. % or, preferably, from 1 to 3 wt. %, based on the total weight of composition solids.

8. The methods in accordance with item 7, above, wherein the aqueous emulsion polymerizing to form the (i) first stage aqueous emulsion copolymer is carried out in the presence of a seed polymer, preferably, an acrylic seed polymer.

9. The methods in accordance with item 7, above, wherein the (i) first stage polymer is made from 0.05 to 1.5 wt. %, or, preferably, from 0.1 to 1.0 wt. % of one or more ethylenically unsaturated acid monomers, based on the total weight of monomers used to make the (i) first stage, such as carboxylic acid and sulfur acid monomers, or their salts, preferably, acrylic acid, methacrylic acid or 4-vinylbenzenesulfonic acid.

10. The methods in accordance with item 7, above, wherein the one or more monoethylenically unsaturated phosphorus acid monomers in the (i) first stage polymer is chosen from dihydrogen phosphate-functional monomers, such as dihydrogen phosphate esters of an alcohol in which the alcohol also contains a polymerizable vinyl or olefinic group, such as allyl phosphate, mono- or diphosphate of bis(hydroxy-methyl) fumarate or itaconate; phosphorus acid containing (meth)acrylic acid esters, such as, for example, phosphates of hydroxyalkyl(meth)acrylates including 2-hydroxyethyl (meth)acrylate and 3-hydroxypropyl (meth)acrylates, and, preferably dihydrogen phosphate monomers, such as, 2-phosphoethyl (meth)acrylate, 2-phosphopropyl (meth)acrylate, 3-phosphopropyl (meth)acrylate, and 3-phospho-2-hydroxypropyl (meth)acrylate; monoethylenically unsaturated phosphonate-functional monomers, such as vinyl phosphonic acid, allyl phosphonic acid, 2-acrylamido-2-methylpropanephosphonic acid, -phosphonostyrene, 2-methylacrylamido-2-methylpropanephosphonic acid; and 1,2-ethylenically unsaturated (hydroxy)phosphinylalkyl (meth)acrylate monomers, such as (hydroxy)phosphinylmethyl methacrylate. Phosphoethyl methacrylate (PEM) is especially preferred.

11. The methods in accordance with item 7, above, wherein the one or more dihydrazide compounds is a compound of the formula $H_2NHN-X-NHNH_2$, wherein X represents a —CO-A-CO— group, A represents a $C_1$ to $C_{12}$ alkylene group or a $C_6$ to $C_{12}$ arylene group, preferably, a $C_1$ to $C_8$ alkylene group, and the "—" represents a covalent bond, preferably, adipic dihydrazide.

Unless otherwise indicated, all temperature and pressure units are room temperature (23-25° C.) and standard pressure (1 atm or 760 mmHg).

All phrases comprising parentheses denote either or both of the included parenthetical matter and its absence. For example, the phrase "(meth)acrylate" includes, in the alternative, acrylate and methacrylate.

As used herein, the term "ASTM" refers to publications of ASTM International, Conshohocken, Pa.

Unless otherwise indicated, as used herein, the term "glass transition temperature" or "Tg" refers to the midpoint glass transition temperature of a polymer as determined by differential scanning calorimetry, measured using a DSC Q2000 (TA Instruments, New Castle, Del.), wherein a given emulsion copolymer sample was dried over night at 60° C. and then the temperature of each sample was ramped to 150° C. at a heating rate of 20° C./min, and equilibrated at 150° C. for 5 min. The $T_g$s were taken as the inflection point of a second heating scan from −90° C. to 150° C. at a heating rate of 7° C./min. The degree of modulation was set at ±1° C., every 40 s.

As used herein, the phrase "acrylic" shall mean (meth) acrylic acid, (meth)alkyl acrylate, (meth)acrylamide, (meth) acrylonitrile and modified forms thereof, such as, for example, (meth)hydroxyalkyl acrylate.

As used herein, the phrase "aqueous" shall mean water or water mixed with 50 wt. % or less, based on the weight of the mixture, of water-miscible solvent.

As used herein, the phrase "60° Gloss" refers to the gloss of a coating, measured at a 60° viewing angle using a Micro-TRI Gloss™ meter (BYK-Gardner GmbH, Geretsried, Del.).

As used herein, the phrase "carboxylic acid or salt" means the subject carboxylic acid in its acid form or its salt form, i.e. carboxylate.

As used herein, the phrase "compatible" shall mean that a component or polymer itself is capable of forming a homogeneous blend with another component or polymer.

As used herein, the phrase "copolymer" shall mean copolymers, terpolymers, tetrapolymers, pentapolymers or hexapolymers, and also to random, block and graft copolymers.

As used herein, the term "hard vinyl monomer" means any monomer which would if polymerized to yield a homopolymer having a weight average molecular weight of 50,000 or greater form such a homopolymer with a glass transition temperature of 40° C. or more. Examples include (meth)acrylonitrile, methyl methacrylate, ethyl methacrylate, isopropyl methacrylate, and styrene.

As used herein, the term "volatile organic compound (VOC) content" refers to that organic portion of a given composition that volatilizes in use conditions of ambient indoor or outdoor coating applications followed by letting the thus applied coating dry over time.

As used herein, the term "soft monomer" refers to any $C_1$ to $C_{24}$ alkyl (meth)acrylate monomer which would if polymerized to yield a homopolymer having a weight average molecular weight of 50,000 or greater form such a homopolymer with a DSC glass transition temperature of 10° C. or less. Examples include methyl acrylate, ethyl acrylate, almost any $C_4$ to $C_{24}$ alkyl (meth)acrylate, for example, t-butyl acrylate, n-hexadecyl acrylate and neopentyl acrylate, isobornyl acrylate, butyl methacrylate, and isobutyl methacrylate. For reference, a comprehensive compilation of available data describing glass transition temperatures of homopolymers can be found in Polymer Handbook, Vol. 1, editors Brandrup, J.; Immergut, E. H.; Grulke, E. A., 1999, pages VI/193-277.

As used herein, unless otherwise indicated, the phrase "weight average molecular weight" or "Mw" refers to the weight average molecular weight of a polymer as measured by gel permeation chromatography (GPC), for emulsion polymers against polystyrene calibration standards using THF and an organic carboxylic acid as the mobile phase and diluent.

As used herein, the phrase "non-tacky" shall refer to compositions which, when applied and dried to form a film are not sticky to the touch.

As used herein, the phrase "nonionic monomer" means a copolymerized monomer residue that does not bear an ionic charge at a pH of from 2 to 13.

As used herein, the term "pigment volume concentration" or %PVC refers to the quantity calculated by the following formula:

PVC(%)=(volume of pigment(s)+volume extender (s)+volume of filler(s))×100 Total dry volume of coating.

As used herein, the phrase "polymer" shall include resins and copolymers.

As used herein, the phrase "resin" shall include polymers and copolymers.

As used herein, the phrase "substantially free of" anything, such as copolymerized hydroxyl group containing monomers or diethylenically or polyethylenically unsaturated vinyl monomers refers to a composition in which none of the thing is added to the composition or is used in the making of the composition.

As used herein, the phrase "total solids" refers to any material, such as resin, polymer, pigment, additive, which does not volatilize under ambient temperature (23-25° C.) and standard pressure conditions. Water, volatile solvents or volatile organic compounds and ammonia are not considered solids.

As used herein, the phrase "vinyl" or "vinyl monomer" shall mean acrylic, vinyl ester, vinyl ether, monovinyl aromatic compounds, such as styrene and a-methyl styrene, and vinyl halides.

As used herein, the phrase "weight average particle size" or "weight average particle size (BI-90)" of any acrylic emulsion polymer, such as a multi-stage acrylic emulsion polymer, refers to the weight average particle size of a distribution of particles as determined by electrical impedance using a BI-90 Multisizer™ 3 Coulter Counter (Beckman Coulter, Inc., Fullerton, Calif.), per manufacturer's recommended procedures.

As used herein, the phrase "wt. %" stands for weight percent.

All ranges recited are inclusive and combinable. For example, an average diameter of 1 μm or more, or 2 μm or more, or 4 μm or more and up to 20 μm, or up 15 μm, will include ranges of 1 μm or more to 20 μm or less, 1 μm or more to 15 μm or less, 2 μm or more to 15 μm or less, 2 μm or more to 20 μm or less, 4 μm or more to 15 μm or less, and 4 μm or more to 20 μm or less.

All phrases comprising parenthesis denote either or both of the included parenthetical matter and its absence. For example, the phrase "(co)polymer" includes, in the alternative, polymer, copolymer and mixtures thereof.

In accordance with the present invention, soft-hard aqueous multistage emulsion copolymer compositions prepared with, for example, 2.0 wt. % of a keto group containing amide monomers, based on the total weight of monomers used to make the emulsion copolymer, and containing a dihydrazide compound demonstrated excellent wet adhesion, Q ultraviolet (QUV) gloss retention, and hardness development. The compositions of the present invention containing, in copolymerized form, a keto group containing amide monomer together with a phosphorus acid monomer, such as phosphoethyl methacrylate (PEM) in a first stage of the multistage copolymer achieve excellent gloss retention, wet adhesion, hardness development, low tack, and block resistance compared to a conventional phosphorus acid containing polymer that does not contain keto group containing amide monomers, in copolymerized form, or which contains such monomers only in a second or hard polymer stage. The advantage of the present invention is achieved for example, by using aqueous multistage emulsion copolymers containing, in copolymerized form, diacetone acrylamide (DAAM) and one or more phosphorus acid monomers in compositions containing a dihydrazide, such as adipic acid dihydrazide (ADH), and opacifiers, such as $TiO_2$. Surprisingly, the incorporation of the keto group containing amide monomer and dihydrazide self-crosslinking chemistry also improved the low temperature film formation of coating. In particular, copolymerizing most or all of the keto group containing amide monomer together with one or more phosphorus acid monomers in the first, soft stage emulsion copolymer improved wet adhesion versus copolymerizing the keto group containing amide monomer in a different stage from the phosphorus acid monomer. Finally, the compositions of the present invention offer excellent block resistance at a low VOC content 150 g/L, or less or, preferably, 100 g/L or less.

To improve wet adhesion in coatings, suitable keto group containing amide monomers for use in the present invention may include diacetone acrylamide (DAAM) or diacetone methacrylamide.

The compositions of the present invention also incorporate both soft and hard phases into a single aqueous multistage emulsion copolymer.

To insure proper coating hardness development, the compositions of the present invention are self-crosslinking and include the soft-hard aqueous multistage emulsion copolymer. Meanwhile, the presence of a majority of the soft first stage (50 to 90 wt. % of multistage emulsion copolymer solids) insures that coatings made from the compositions of the present invention exhibit good low temperature film formation.

Suitable examples of the dihydrazide compound (a) for use in the compositions of the present invention include dibasic acid dihydrazides, such as carbodihydrazides generated by the reaction of a carboxylic acids and hydrazine, oxalic acid dihydrazide, malonic acid dihydrazide, succinic acid dihydrazide, adipic acid dihydrazide, azelaic acid dihydrazide, sebacic acid dihydrazide, dodecane diacid dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, dimer acid dihydrazide and 2,6-naphthoic acid dihydrazide. Various basic acid dihydrazide compounds described in JP-B-02-4607, and 2,4-dihydrazino-6-methylamino-sym-triazine are also suitable. Adipic dihydrazide is the most preferred carbodihydrazide.

To improve gloss retention, suitable monoethylenically unsaturated phosphorus acid monomers for making aqueous multistage emulsion copolymers of the present invention may be in the acid form or as a salt of the phosphorus acid groups. Examples of suitable mono-ethylenically unsaturated phosphorus acid monomers include any of the following formulae:

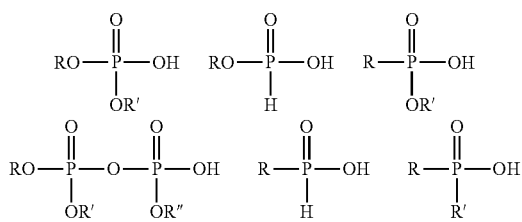

wherein R is an organic group containing an acryloxy, methacryloxy, allyl, or a vinyl group; and R' and R" are independently selected from H and a second organic group. The second organic group may be saturated or unsaturated.

Suitable monoethylenically unsaturated phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable mono-ethylenically unsaturated phosphorus acid monomers include phosphonate-functional monomers, such as vinyl phosphonic acid, allyl phosphonic acid, 2-acrylamido-2-methylpropanephosphonic acid, alpha-phosphonostyrene, 2-methylacrylamido-2-methylpropanephosphonic acid. Further suitable mono-ethylenically unsaturated phosphorus functional monomers are 1,2-ethylenically unsaturated (hydroxy)phosphinylalkyl (meth)acrylate monomers, such as (hydroxy)phosphinylmethyl methacrylate. Preferred mono-ethylenically unsaturated phosphorus acid monomers are dihydrogen phosphate esters such as phosphates of alkyl (meth)acrylates, phosphates of hydroxyalkyl (meth)acrylates and salts thereof. Dihydrogen phosphate monomers include 2-phosphoethyl (meth)acrylate, 2-phosphopropyl (meth)acrylate, 3-phosphopropyl (meth)acrylate, and 3-phospho-2-hydroxypropyl (meth)acrylate. Phosphoethyl methacrylate is especially preferred.

To improve softness in coatings made therefrom, the first stage polymer is made from a monomer mixture comprising soft monomers and amounts thereof selected to form a polymer that has a Tg of from −50° C. to 30° C.

Suitable nonionic monomers for use in making the aqueous multistage emulsion copolymer of the present invention include acrylic and vinyl nonionic monomers. Acrylic nonionic monomers may include, for example, one or more $C_{1-30}$ alkyl (meth)acrylate monomer, $C_{5-30}$ cycloalkyl (meth)acrylate, or $C_{5-30}$ (alkyl)aryl (meth)acrylate monomer, including, for example, methyl methacrylate, isodecyl methacrylate and the low Tg acrylic monomers. Suitable soft monomers include but are not limited to ethyl acrylate (EA), butyl acrylate (BA), t-butyl acrylate (t-BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth)acrylate, methyl acrylate, butyl methacrylate (n-BMA).

Vinyl nonionic monomers may include, for example, vinyl acetate or other vinyl esters; vinyl monomers, such as styrene or substituted styrenes, including α-methyl styrene, vinyl chloride, and vinylidene chloride Preferably, the first stage polymer of the (i) multi-stage acrylic emulsion (co)polymers comprise (co)polymers which are the polymerization product of monomers chosen from EA, BA, n-BMA, 2-EHA, or MMA, especially EA, BA, n-BMA and 2-EHA, or an admixture of any of these with MMA.

For use in making the first stage polymer of the present invention, suitable copolymerizable ethylenically unsaturated carboxylic acid group containing monomers may include, for example, acrylic acid, methacrylic acid, crotonic acid, itaconic acid, fumaric acid, maleic acid, monomethyl itaconate, monomethyl fumarate, monobutyl fumarate, maleic anhydride, styrylic acid, and the anhydrides and salts thereof. Preferred carboxylic acid monomers are acrylic acid, (meth)acrylic acid, and itaconic acid. Such monomers confer water dispersibility to acrylic and vinyl emulsion polymer binders.

Ethylenically unsaturated sulfur acid group containing monomers may include, for example, styrene sulfonic acid, 4-vinylbenzenesulfonic acid or their salts.

Preferably, the multi-stage aqueous emulsion polymers of the present invention are substantially free of or contain 0.1 wt. % or less, based on the total solids weight of monomers used to make the multi-stage acrylic emulsion polymer, of copolymerized diethylenically or polyethylenically unsaturated monomers other than diethylenically or polyethylenically unsaturated phosphorus acid monomers.

In general, the aqueous multistage emulsion copolymers of the present invention are formed by aqueous emulsion polymerization in the presence of an initiator, such as a thermal initiator like a peracid, e.g. persulfate, or a peroxide, or a redox pair, such as a peracid or peroxide and a reducing agent like a bisulfite or an organic sulfoxylate. Such emulsion polymerization methods are conventional in the art and are described below in more detail.

In emulsion polymerization, monomer mixture(s) may be added neat or as an emulsion in water. One or more monomer mixtures may be added in one or more additions and may be added continuously over all or part the reaction period or not continuously over all or part of the reaction period. One or more monomer mixture can be added linearly, such as in the case of gradual addition (grad add), or not, such as, for example, in semi-continuous polymerization or addition all at once as a "shot", or in any combination thereof.

In emulsion polymerization, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids, sulfosuccinate salts; fatty acids; ethylenically unsaturated surfactant monomers; and ethoxylated alcohols or phenols. Preferably, the surfactant is one or more ethoxylated alkyl sulfate or its salt, such as sodium laureth sulfate. The amount of surfactant used is usually 0.1% to 6% by weight, based on the weight of monomer. The same surfactants and amounts thereof are used in both single stage and in multi-stage emulsion polymerization processes.

Either thermal or redox initiation processes may be used in either single stage or multi-stage emulsion polymerization processes. Known free radical initiators may be used at a level of from 0.01 to 3.0 wt. %, based on the weight of total monomer, such as, for example, peroxides, ammonium and/or alkali persulfates. Redox systems using the same initiators may be used coupled with a suitable reductant such as, for example, (iso)ascorbic acid, alkali metal and ammonium salts of sulfur-containing acids, such as sodium sulfite, bisulfite, formadinesulfinic acid, hydroxymethanesulfonic acid, sodium sulfoxylate formaldehyde, 2-hydroxy-2-sulfinatoacetic acid, 2-hydroxy-2-sulfonatoacetic acid, amines such as ethanolamine, glycolic acid, glyoxylic acid hydrate, mercaptans, such as mercaptopropionic acid or methyl-3-mercaptopropionate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used at from 0.001 to 3.0 wt. %, based on the weight of total monomer.

To improve polymer softness, the first stage polymer may be formed in the presence of up to 15 wt. % or, preferably, from 3 to 12 wt. %, or, more preferably, from 3 to 10 wt. %, based on the total solids weight of the monomers used to make the first stage polymer, of one or more chain transfer agent.

Chain transfer agents, may be used to lower the molecular weight of the formed polymer of one or more of the polymer stages and may be added in one or more additions or continuously, linearly or not, over most or all of the entire reaction period or during limited portion(s) of the reaction period. Suitable chain transfer agents may include, for example, halogen compounds such as tetrabromomethane; allyl compounds; and, preferably, mercaptans, such as alkyl thioglycolates, alkyl mercaptoalkanoates, and $C_4$-$C_{22}$ linear or branched alkyl mercaptans, and, more preferably, methyl 3-mercaptopropionate, butyl 3-mercaptopropionate, n-hexylmercaptan, n-dodecyl mercaptan, and mixtures thereof. Suitable amounts of chain transfer agents may range up to 15 wt. %, preferably, from 0.1 to 5 wt. %, based on the total solids weight of all monomers used to make the given polymer.

In any emulsion polymerization at atmospheric pressure, the reaction temperature should be maintained at a temperature lower than 100° C. throughout the course of the reaction, for example, at 30° C. or more, or 95° C., or 60° C. or more, or up to 90° C.

Most preferably, the (i) first stage one or more aqueous multistage emulsion copolymer comprises, in copolymerized form, at least 98 wt. %, or, preferably, all of the one or more monoethylenically unsaturated phosphorous acid monomers in the aqueous multistage emulsion copolymer.

Aqueous compositions of the present invention may be used as coating compositions and may take the form of waterborne dispersions, e.g. alkaline, anionic or non-ionic. The compositions may further comprise conventional additives in conventional amounts, such as, for example, flow or wetting agents, thickeners or rheology modifiers or their mixtures, curing agents, pigments or colorants, opacifiers and extenders, dispersants, silicones or wetting agents, adhesion promoters, flow and leveling agents, antioxidants or plasticizers.

Preferably, the compositions comprise no or a very low amount of VOC solvents or coalescents, enabling good film formation in a low VOC use.

The aqueous compositions can comprise from 0 to 90 wt. %, or, preferably, up to 70 wt. %, based on the total solids weight of the composition, of one or more pigments or colorants, including iron oxides, opacifier pigments, such as, for example, titanium dioxide, and opacifying polymers.

The compositions of the present invention can be pigmented/filled other additives including pigments, which may be organic or inorganic and may functionally contribute to opacity, e.g. titanium dioxide or hollow core or void containing polymer pigments, and color, e.g. iron oxides, micas, aluminum flakes and glass flakes, silica pigments, or organic pigments, such as phthalocyanines, and corrosion protection, e.g. zinc, phosphates, molybdates, chromates, vanadates, cerates, in addition to durability and hardness such as silicates. Generally, when pigments are included in the coating compositions, the weight ratio of pigment to the total solid of polymer resin may range from 0.1:1 to 8:1, preferably, up to 3:1.

The compositions of the present invention may be used for making clearcoats, wherein they have no pigments or may include pigments or fillers that do not alter clarity, such as subcritical amounts of pigments having a refractive index of less than 1.7, e.g. silica, talc, calcium carbonate or alumina.

In another aspect of the present invention, the methods of using the aqueous compositions comprise forming the aqueous composition, applying the coating composition to one or more substrate and drying, optionally, curing, the coating composition. Drying may be performed in a known manner such as, for example, air drying or heat drying at temperatures that will not damage the substrate, e.g. 150° C. or below, or 100° C. or below. The aqueous compositions may be applied to architectural or industrial wood substrates, by any known method, such as, for example, spray, brush, roll, electrostatic bell or fluid bed methods, including air-atomized spray, air-assisted spray, airless spray, high volume low pressure spray, and air-assisted airless spray, by roll coating or knife coating.

Coatings made from the aqueous compositions of the present invention may include basecoats, color coats and topcoats comprising any of clearcoats, stains or translucent coatings, pigmented color coats and paints.

The aqueous coating compositions may be applied to various substrates, including but not limited to wood, natural wood, plywood, engineered wood, such as medium density fiberboard (MDF), particle board, or laminated veneer lumber other lignocellulosic and wood containing composites. The compositions are especially useful for exterior substrates, such as window and door frames, millwork and exterior trim.

EXAMPLES: In the following examples, unless otherwise indicated, all units of temperature are room temperature (23-25° C.) and all units of pressure are standard pressure (1 atm or 760 mBar).

TABLE 1

Materials

| Abbreviation | Name |
| --- | --- |
| Surfactant A | Sodium laureth-4-sulfate, sodium salt of a $C_{12}$-$C_{14}$ alkyl ether sulfate having 4 ethylene oxide groups per molecule, 31% active in water |
| Surfactant B | Sodium laureth-12-sulfate, sodium salt of a $C_{12}$-$C_{14}$ alkyl ether sulfate having 12 ethylene oxide groups per molecule, 30% active in water |
| DPM | Dowanol ™ DPM dipropylene glycol monomethyl ether (The Dow Chemical Company, Midland, MI (Dow)) |
| ester alcohol | Texanol ™ 2,2,4-trimethyl-1,3-pentanediol monoisobutyrate (Eastman Chemical, Kingsport, TN) |
| alkyne diol | Surfynol ™ 104E 2,4,7,9-tetramethyl-5-decyn-4,7-diol 50% in ethylene glycol solution (Air Products, Inc., Allentown, PA) |
| DPnB | Dowanol ™, DPnB dipropylene glycol n-butyl ether $C_4H_9O[CH_2CH(CH_3)O]_2H$ (major isomer) (Dow) |
| PnB | Dowanol ™ PnB propylene glycol n-butyl ether (Dow) |
| $TiO_2$ rutile | Ti-Pure ™ R-706 titania (Chemours, Wilmington, DE) |
| Dispersant | Tamol ™ 165A hydrophobic copolymer electrolyte dispersant (Dow) |
| Defoamer 1 | BYK-024 mixture of polysiloxanes and hydrophobic solids in polyglycol defoamer (Byk U SA, Wallingford, CT) |
| Defoamer 2 | BYK-028 mixture of polysiloxane and hydrophobic solids in polyglycol defoamer (Byk USA) |
| Wetting Agent | BYK-349 polyether modified siloxane wetting agent (Byk USA) |
| Rheology Modifier | Acrysol ™ RM-8W hydrophobically modified ethylene oxide urethane (HEUR) polymer rheology modifier (Dow) |

In the following examples, the abbreviations have the meanings set forth in Table 1, above, and, abbreviations used below include: MMA=methyl methacrylate; BA=n-butyl acrylate; BMA=n-butyl methacrylate; AA=acrylic acid; PEM=phosphoethyl methacrylate (PEM) (65 wt. % active); DAAM=diacetone acrylamide; ADH=adipic dihydrazide.

SYNTHESIS OF POLYMER IN EXAMPLE 1

A first monomer emulsion was prepared by mixing deionized (DI) water (223.5 g), surfactant B (19.5 g,), DAAM (33.2 g), PEM (28.7 g), BA (314.9), BMA (640.9 g), and MMA (81.8 g). A second monomer emulsion was prepared by mixing DI water (115.8 g), surfactant B (13.5 g), AA (7.7 g), BA (61.3 g), and MMA (518.3 g).

The aqueous multistage emulsion copolymer of the present invention was prepared by adding deionized (DI) water (1124 g) to a 5-liter, four-necked round bottom flask under a nitrogen atmosphere. The flask, which was equipped with a paddle stirrer, reflux condenser, and a thermometer, was heated to 85° C. and stirring was initiated. A solution containing surfactant A (55.0 g) and 13.5 g of DI water was added to the flask. A portion of the first monomer emulsion (90.7 g) was then quickly added to the flask. Next, an initiator solution containing ammonium persulfate (4.3 g) in DI water (33.2 g) and then a rinse of DI water (4.3 g) were added to the flask. Then, the remainder of the first monomer emulsion and an initiator solution of ammonium persulfate (1.7 g) in DI water (110.5) were fed into the flask separately and linearly over a period of 60 minutes, while maintaining the contents of the flask at a temperature of approximately 85° C. When all the additions were complete, the container that held the first monomer emulsion was rinsed with DI water (41.0 g), which was added to the flask. Subsequently, the second monomer emulsion, and an initiator solution of ammonium persulfate (0.9 g) in DI water (55.3) were fed into the flask separately and linearly over a period of 30 minutes. When all the additions were complete, a DI water (50.0 g) rinse was added to the flask. Next, the contents of the flask were cooled to 70° C. and 14 g aqueous ammonia (28%) was added to the flask. A redox pair was added to the flask to reduce residual monomer content. Next, the contents of the flask were cooled to 45° C. To obtain the targeted pH range of 7 to 9, aqueous ammonia (24.2 g, 28 wt. % active) was added to the flask. Following the pH adjustment, ADH (26.5 g) in DI water (108.6 g) was added to the flask. The resulting aqueous dispersion, Example 1, had a percent total solids (% T.S.) content of 45.1 wt. % and a pH of 8.5. The visual and mechanical MFFT values were 3.0° C. and 5.4° C. respectively. The weight average particle size was 101 nm.

SYNTHESIS OF POLYMERS IN EXAMPLES 2, 1C, 2C, 3, 3C AND 4

The aqueous multistage emulsion copolymers of Example 2, 3, 1C, 2C and 3C were made in the same manner as that of the polymer of Example 1, above, using the monomer mixtures set forth in Tables 2 and 7, below.

Example 2 was prepared substantially as described in Example 1, except that a portion of the DAAM (21.55 g) was added to the first monomer emulsion and the remainder of the DAAM (11.60) added to the second monomer emulsion. Following polymerization, to obtain an emulsion with the targeted pH range of 7-9, aqueous ammonia (20.5 g, 28% active) was added to the flask The resulting aqueous dispersion, Example 2, had a percent total solids (% T.S.)

content of 44.9 wt. % and a pH of 7.7. The visual and mechanical MFFT values were 0.9° C. and 6.2° C. respectively. The weight average particle size was 106 nm.

Comparative example 1C was prepared substantially as described in Example 1, except that all the DAAM (33.15 g) was removed from the first monomer emulsion and added to the second monomer emulsion. Following polymerization, to obtain an emulsion with the targeted pH range of 7-9, aqueous ammonia (20.5 g, 28% active) was added to the flask. The resulting aqueous dispersion, Example 1C, had a percent total solids (% T.S.) content of 45.1 wt. % and a pH of 7.3. The visual and mechanical MFFT values were 9.1° C. and 11.6° C. respectively. The weight average particle size was 121 nm.

Comparative example 2C was prepared substantially as described in Example 1, except that the DAAM was removed from the first monomer emulsion and the ADH was not added to the aqueous dispersion. Following polymerization, to obtain an emulsion with the targeted pH range of 7-9, aqueous ammonia (21.1 g, 28% active) was added to the flask. The resulting aqueous dispersion, Example 2C, had a percent total solids (% T.S.) content of 44.1 wt. % and a pH of 7.5. The visual and mechanical MFFT values were <4.1° C. and >23.1° C. respectively. The weight average particle size was 112 nm.

Example 3 was prepared substantially as described in Example 1, except that there was an increase in the PEM and AA in the first and second monomer emulsions respectively. PEM (34.26 g) was added to the first monomer emulsion and AA (15.47 g) was added to the second monomer emulsion. Following polymerization, to obtain an emulsion with the targeted pH range of 7-9, aqueous ammonia (11.8 g, 28% active) was added to the flask. The resulting aqueous dispersion, Example 3, had a percent total solids (% T.S.) content of 45.5 wt. % and a pH of 7.8. The visual and mechanical MFFT values were 0.3° C. and 5.7° C. respectively. The average particle size was 110 nm.

Comparative example 3C was prepared substantially as described in Example 1, except that there the PEM in first monomer emulsion was replaced with AA (34.26 g). Additionally, there was an increase in the AA (15.47 g) in the second monomer emulsion. Following polymerization, to obtain an emulsion with the targeted pH range of 7 to 9, aqueous ammonia (15.3 g, 28% active) was added to the flask. The resulting aqueous dispersion, Example 3C, had a percent total solids (% T.S.) content of 44.4 wt. % and a pH of 7.8. The weight average particle size was 105 nm.

Example 4 was prepared substantially as described in Example 1, except that sodium 4-vinylbenzenesulfonate (5.62 g) was added to the first monomer emulsion and there was a decrease in the DI water (1023 g) added to the 5-liter, four-necked round bottom flask. Following polymerization, to obtain an emulsion with the targeted pH range of 7-9, aqueous ammonia (20.0 g, 28% active) was added to the flask. The resulting aqueous dispersion, Example 2, had a percent total solids (% T.S.) content of 45.5 wt. % and a pH of 8.6. The visual and mechanical MFFT values were 1.2° C. and 8.5° C. respectively. The weight average particle size was 105 nm.

Formulations: The compositions of the present invention were formulated by incorporating a dihydrazide compound, as shown in Table 2, below, into the aqueous multistage emulsion copolymer and then performing a letdown to include pigments and coating materials, as set forth in Table 3, below.

TABLE 2

Aqueous Multistage Emulsion Copolymer Compositions

| Example | Composition | DAAM (wt. %) | ADH level | Tg (DSC, ° C.) |
|---|---|---|---|---|
| 1 | 65.0 (58.3 BMA/28.6 BA/7.4 MMA/3.0 DAAM/2.6 PEM) // 35.0 (88.2 MMA/10.4 BA/1.3 AA) | 2.0 | 1.6 | 5/96 |
| 2 | 64.5 (58.9 BMA/28.9 BA/7.5 MMA/2.0 DAAM/2.6 PEM) // 35.5 (86.5 MMA/10.2 BA/1.3 AA/1.9 DAAM) | 2.0 | 1.6 | 6/99 |
| 1C | 63.2 (60.1 BMA/29.5 BA/7.7 MMA/2.7 PEM) // 36.8 (83.5 MMA/9.9 BA/5.3 DAAM/1.2 AA) | 2.0 | 1.6 | 9/99 |
| 2C | 64.5 (60.1 BMA/29.5 BA/7.7 MMA/2.7 PEM) // 35.5 (88.2 MMA/10.4 BA/1.3 AA) | 0 | 0 | 8/100 |
| 4 | 65.3 (58.0 BMA/28.5 BA/7.4 MMA/3.0 DAAM/2.6 PEM/0.5 SSS)// 34.7 (88.2 MMA/10.4 BA/1.3 AA) | 2.0 | 1.6 | 4/98 |

Test Methods: The coating compositions were tested, as follows:

Gloss: Gloss values were obtained according to ASTM D523-89(1999) Standard Test Method for Specular Gloss. Drawdowns over chromate pre-treated aluminum panels were prepared using a 381 um Dow latex film applicator, and allowed to dry in the constant temperature room (23±3° C., 50%±5% relative humidity) for 7 days. The gloss measurement was performed using micro-TRI-gloss meter from BYK Gardner (Columbia, MD). Each value reported is an average of three measurements on different positions of the same drawdown. The initial gloss values were taken before panels were placed in a QUV cabinet. Accelerated exposure (QUV gloss) testing in a QUV cabinet was performed according to ASTM D-4587-11 (2011). Test cycles used for fluorescent UV-condensation exposure testing included 8 hours of UV radiation at 60° C., followed by 4 hours of condensation at 50° C., repeated continuously for the indicated period, 1000 or 2000 hours. The QUV chamber was equipped with a UVA bulb (340 nm) and the irradiance during the UV cycle was 0.89 W/(m$^2$·nm). After a set time interval, the panels were removed from the chamber and the gloss was measured after allowing the panels to dry and equilibrate to room temperature. After the gloss measurements, the panels were placed back into the chamber immediately to continue the testing until a set number of hours exposure had been reached.

Pendulum (König) Hardness: Hardness was measured on coated aluminum panels according to ASTM D4366-95 using a TQC SP0500 Pendulum Hardness Tester (TQC-USA Inc., Metamora, Mich.). The results were reported in seconds. Draw downs over chromate pretreated aluminum plates were prepared using 127 μm polytetrafluorethylene drawdown bar. The coating films were dried in constant temperature room (12±3° C., 50%±5% relative humidity) for described lengths of time before the König hardness measurement.

Early Block Resistance: To test blocking resistance, drawdowns over chromate pretreated aluminum plates were prepared using a 127 μm polytetrafluorethylene drawdown bar. The drawdowns were dried for 30 seconds at ambient temperature (23-25° C.), 6 minutes in a 40° C. oven, and then cooled to ambient temperature for 30 seconds. The panels were then transferred to a constant temperature room (23±3° C., 50%±5% relative humidity), and cut into 38 mm×38 mm sections, in duplicates. The cut sections were placed face-to-face with standard rubber #8 stoppers (1.0 Kg weight). After 16.0 hours duration (duplicates), the stopper was removed and the panels rated according to the European rating shown in Table A1, below.

TABLE 3

Coating Compositions and Their Characteristics

| Example | 1 | 2 | 1C | 2C | 4 |
|---|---|---|---|---|---|
| Grind | (amount in Kg) | | | | |
| Water | 26.37 | 26.37 | 26.37 | 26.37 | 26.37 |
| Dispersant | 4.01 | 4.01 | 4.01 | 4.01 | 4.01 |
| alkyne diol | 1.27 | 1.27 | 1.27 | 1.27 | 1.27 |
| Defoamer 1 | 0.37 | 0.37 | 0.37 | 0.37 | 0.37 |
| TiO$_2$ rutile | 84.14 | 84.14 | 84.14 | 84.14 | 84.14 |
| Grind Sub-total | 116.16 | 116.16 | 116.16 | 116.16 | 116.16 |
| LetDown | | | | | |
| Inventive Ex 1 | 242.86 | | | | |
| Inventive Ex 2 | | 243.94 | | | |
| Comparative Ex 1 | | | 242.86 | | |
| Comparative Ex 2 | | | | 248.37 | |
| Inventive Ex 4 | | | | | 240.72 |
| Water | 40.00 | 39.00 | 40.00 | 35.00 | 42.00 |
| Defoamer 2 | 0.40 | 0.40 | 0.40 | 0.40 | 0.40 |
| Aqua ammonia 15% w/w in water | 0.00 | 0.80 | 0.87 | 0.48 | 0.00 |
| Add Grind Above here | 116.16 | 116.16 | 116.16 | 116.16 | 116.16 |
| Wetting Agent | 1.60 | 1.60 | 1.60 | 1.60 | 1.60 |
| ester alcohol | 2.19 | 2.19 | 2.19 | 2.19 | |
| DPM | 4.38 | 4.38 | 4.38 | 4.38 | |
| DPnB | | | | | 3.29 |
| PnB | | | | | 3.29 |
| Rheology Modifier | 1.43 | 1.40 | 1.20 | 1.20 | 1.40 |
| Water | 2.25 | 1.43 | 1.57 | 1.77 | 1.88 |
| Totals | 411.27 | 411.30 | 411.22 | 411.55 | 410.74 |
| Property of Composition | | Value | | | |
| Total PVC | 18% | 18% | 18% | 18% | 18% |
| Volume Solids | 35% | 35% | 35% | 35% | 35% |
| Weight Solids | 47% | 47% | 47% | 47% | 47% |
| pH | 8.3 | 8.4 | 8.5 | 8.1 | 8.5 |
| MFFT (Visual) ° C. | <0 | <0 | <0 | <0 | <0 |
| MFFT (mechanical) ° C. | <10 | <10 | <10 | <10 | <10 |

TABLE A1

Early Block Resistance Rating

| Stickiness: | Surface Damage: |
|---|---|
| 5: Panels do not stick at all | OK: no damage, 0% |
| 4: Panels stick slightly together | mOK, <10% |
| 3: Panels stick together | m: minor, <20% |

TABLE A1-continued

Early Block Resistance Rating

| Stickiness: | Surface Damage: |
|---|---|
| 2: Difficult to take apart | mM, <50% |
| 1: Very difficult to take apart | M: major, <80% |
| 0: Panels completely stuck together | MM: >80% |

Minimum Film Formation Temperature (MFFT): MFFT was determined on a Rhopoint MFFT instrument (Rhopoint Instruments, UK). A 25.4 mm cube sheen film applicator with gap size of 381 μm was used to drawdown films on the strips of Scotch™ tape (3M, Minneapolis, Minn.) placed over a temperature gradient plate. The visual MFFT was decided by the lowest temperature at which there was no visual cracking and/or powdery appearance of the film. The mechanical MFFT was determined by the temperature at which the continuous cracking of the film started when slowly pulling the Scotch™ tape perpendicularly to the plate from the high temperature end.

Wet Adhesion: The wet adhesion test was performed according to SKH publication 05-01 (SKH, Wageningen, the Netherlands). Pine panels used for this test were free of surface defects. Before coating application, the panels were sanded using 3M Premium Automotive Sandpaper, 320 Grit (3M) and then conditioned in the constant temperature room (CTR) (23±3° C., 50%±5% relative humidity) for at least 24 hours before coating application. A measured amount of coating was brush applied on the wood surface for a target dry film thickness of 60 μm. The applied coating was dried in the CTR for 4 hours before a second layer of coating was applied to it. The second layer of coating was then brush applied for a target dry film thickness of 60 μm. The coating was then dried in the CTR for 24 hours. The coating surface was then kept under wet conditions using wet tissue soaked with deionized (DI) water for 24 hours. To determine the wet adhesion, immediately after the removal of the wet tissue, the coating surface was blotted dry and five by five cross cuts were made through the coating with a sharp knife at an angle of 30° to the wood grain and perpendicular to the coating surface. The angle between the cross cuts were about 60° and the distance between the parallel lines was about 1 cm. Pressure-sensitive tape was then applied on the cuts by strongly pressing the tape onto the substrate. The tape was then removed from the substrate in a fast and continuous movement at an angle close to 180°. The surface damage of the coating was accessed according to the scale in Table A2, below.

TABLE A2

Wet Adhesion Surface Damage

| Rating | Description |
|---|---|
| 0 | No damage to the surface |
| 1 | <5% of the coating is removed. |
| 2 | 5% to 15% of the coating is removed. |

TABLE A2-continued

| Wet Adhesion Surface Damage | |
|---|---|
| Rating | Description |
| 3 | 15% to 35% of the coating is removed. |
| 4 | 35% to 65% of the coating is removed. |
| 5 | >65% of the coating is removed. |

Test results from the compositions in Examples 1, 2, 1C and 2C are shown in Table 4, below.

TABLE 4

| Performance Results | | | | | |
|---|---|---|---|---|---|
| Example | 1 | 2 | 1C | 2C | 4* |
| 1 day König Hardness (seconds) | 24.4 | 21.5 | 20.8 | 20.1 | 27 |
| 7 day König hardness (seconds) | 30.9 | 27.2 | 27.3 | 24.4 | 36 |
| Early Block‡ | 3; mOK | 3; mOK | 3; mOK | 3; mOK | 4; mOK |
| 20° Gloss | 50.1 | 48.9 | 46.8 | 33.4 | 51.1 |
| 60° Gloss | 74.7 | 74.2 | 73.9 | 68.2 | 75.4 |
| Wet Adhesion on bare pine (% film removed) | <5% | <5% | 10-15% | 15-35% | <5% |
| Low Temperature Film formation on white pine (4° C./40RH %)† | 7 | 7 | 5 | 4 | 9 |

‡The first figure is stickiness rating and second is surface damage rating.
†Coatings were brush applied on white pine panel with a target dry film thickness of 60 um at 4° C./40RH %. After drying the coating at 4° C./40RH % for at least 16 hours, the appearance of coating were evaluated. A higher rating indicates better film formation. Rating of 7 or above indicates slight/trace cracking. Rating of 5 or below indicates moderate to severe cracking.
*Example 4 was formulated and characterized at a separate time from the other four examples.

Table 4, above, shows the key application performance of inventive Examples 1 and 2 and comparative Examples 1C and 2C. Compositions comprising DAAM, in copolymerized form, in the first stage (Example 1) of the aqueous multistage emulsion copolymer provided the highest König hardness, gloss and best wet adhesion. Moving nearly half of the copolymerized DAAM to the second stage (Example 2) showed slightly lower König hardness, but still maintained good wet adhesion. Moving all the DAAM to the second stage of the aqueous multistage emulsion copolymer (Example 1C) resulted in dramatically worse wet adhesion and in poorer film formation. The coating without copolymerized DAAM and dihydrazide compound (Example 2C) showed the lowest König hardness, and the worst wet adhesion and film formation at low temperature. Inventive Example 4, formulated separately using a different combination of solvents and the same low VOC content, made coatings that showed improved König hardness development over time, excellent low temperature film formation, as well as improved wet adhesion, especially in comparison to coatings from polymers in comparative Examples 1C and 2C.

Tables 5 and 6, below show gloss retention data of the inventive Examples 1 and 2 and comparative Examples 1C and 2C. For 20° gloss, the inventive examples showed the best gloss retention, followed by example 1C. Without DAAM and the dihydrazide compound, Example 2C showed much worse gloss retention in both 20° and 60° gloss.

TABLE 5

QUV 20° gloss retention percentage of Example 1, 2, 1C, and 2C:

| | Example | | | | |
|---|---|---|---|---|---|
| Hours | 1 | 2 | 1C | 2C | 4 |
| 0 | 100% | 100% | 100% | 100% | 100% |
| 194 | 92% | 92% | 87% | 51% | 94% |
| 440 | 90% | 91% | 84% | 43% | 95% |
| 1086 | 94% | 92% | 78% | 45% | 85% |

TABLE 6

QUV 60° gloss retention percentage of Example 1, 2, 1C, and 2C:

| | Example | | | | |
|---|---|---|---|---|---|
| Hours | 1 | 2 | 1C | 2C | 4 |
| 0 | 100% | 100% | 100% | 100% | 100% |
| 194 | 98% | 98% | 97% | 79% | 99% |
| 440 | 98% | 99% | 98% | 74% | 101% |
| 1086 | 107% | 104% | 98% | 76% | 105% |

As shown in Tables 5 and 6, above, the compositions containing the emulsion polymers of Examples 1 and 2 and 4 outperformed the comparative compositions containing the emulsion polymers of Comparative examples 1C and 2C. The difference was especially notable after a prolonged period of time.

Additional aqueous multistage emulsion copolymers, shown in Table 7, below, were synthesized according to the method as set forth in Example 1, above, except with the material proportions set forth in the Table 7, below. The aqueous multistage emulsion copolymers were then letdown in Table 8, below.

TABLE 7

| More Aqueous Multistage Emulsion Copolymer Compositions | | | | | |
|---|---|---|---|---|---|
| Example | Composition | DAAM (wt. %) | ADH (wt. %) | % T.S. | pH |
| 3 | 65.0 (58.0 BMA/28.5 BA/7.4 MMA/3.0 DAAM/3.1 PEM) // 35.0 (87.1 MMA/10.3 BA/2.6 AA) | 2.0 | 1.6 | 45.5 | 7.82 |
| 3C | 65.0 (58.0 BMA/28.5 BA/7.4 MMA/3.0 DAAM/3.1 AA) // 35.0 (87.1 MMA/10.3 BA/2.6 AA) | 2.0 | 1.6 | 44.4 | 7.79 |

TABLE 8

Coating Compositions and Their Characteristics

| | Example 3 | Example 3C |
|---|---|---|
| Material Name | | |
| Water | 26.35 | 26.37 |
| Dispersant | 4.01 | 4.01 |
| Alkyne diol | 1.27 | 1.27 |
| Defoamer 1 | 0.37 | 0.37 |
| $TiO_2$-rutile | 84.14 | 84.14 |
| Grind Sub-total | 116.14 | 116.16 |
| Polymer Inventive Ex 3 | 240.72 | |
| Polymer Comparative Ex 3 | | 246.69 |
| Water | 42.00 | 38.00 |
| Defoamer 2 | 0.40 | 0.40 |
| Aqua ammonia 15% w/w in water | 0.20 | 0.30 |
| Add Grind (from Above) | 116.14 | 116.16 |
| Defoamer 3 | 1.60 | 1.60 |
| DPnB | 2.19 | 2.19 |
| PnB | 4.38 | 2.19 |
| Rheology Modifier | 1.60 | 1.40 |
| Water | 1.46 | 2.39 |
| Totals | 410.69 | 411.32 |
| Property | | |
| Total PVC | 18% | 18% |
| Volume Solids | 35% | 35% |
| Weight Solids | 47% | 47% |
| pH | 8.1 | 7.9 |
| MFFT (visual) ° C. | <0 | <0 |
| MFFT (mechanical) ° C. | <10 | <10 |

Tables 9 and 10, below, show gloss retention data of the inventive Example 3 and comparative Example 3C and show that the inventive compositions dramatically outperform the comparative in gloss retention.

TABLE 9

QUV 20° gloss retention percentage of Examples 3 and 3C:

| | Example | |
|---|---|---|
| Hours | 3 | 3C |
| 0 | 100% | 100% |
| 500 | 97% | 51% |
| 1000 | 98% | 24% |
| 1500 | 90% | 22% |
| 2000 | 86% | 13% |

TABLE 10

QUV 60° gloss retention percentage of Examples 3, and 3C:

| | Example | |
|---|---|---|
| Hours | 3 | 3C |
| 0 | 100% | 100% |
| 500 | 103% | 85% |
| 1000 | 107% | 68% |
| 1500 | 104% | 65% |
| 2000 | 104% | 66% |

Tables 9 and 10, above, showed the gloss retention data of inventive Example 3 and comparative Example 3C. Inventive Example 3 showed much better gloss retention by incorporating a phosphorus acid, in copolymerized form (PEM) vs. the Comparative example 3C that does not contain PEM.

We claim:

1. An aqueous composition comprising aqueous multistage emulsion copolymer compositions comprising (a) one or more dihydrazide compounds in a total amount of from 0.5 to 4 wt. %, based on the total weight of composition solids, and (b) of one or more aqueous multistage emulsion copolymers containing, as (i) a first stage, an emulsion copolymer having a glass transition temperature (Tg) via differential scanning calorimetry (DSC) of from −50 to 30° C., and containing, in copolymerized form, from 0.5 to 3.0 wt. % of one or more monoethylenically unsaturated phosphorous acid monomers and, from 0.75 to 5 wt. % of one or more keto group containing amide monomers, and, as (ii) a second stage, an emulsion copolymer having a DSC Tg of from 50° C. to 125° C., wherein the Tg difference between the first stage and the second stage is from 45° C. to 150° C. having a weight ratio of (i) the first stage to (ii) the second stage, based on copolymer solids, ranging from 50:50 to 90:10 or, all monomer wt. % s based on the total weight of monomers used to make the aqueous multistage emulsion copolymer, and, further wherein, the (ii) second stage of the aqueous multistage emulsion copolymer comprises, in copolymerized form, no more than 25 wt. % of the total monoethylenically unsaturated phosphorous acid monomers used to make the aqueous multistage emulsion copolymer, and no more than 50 wt. % of the total keto group containing amide monomers used to make the aqueous multistage emulsion copolymer, and wherein (b) at least one of the one or more aqueous multistage emulsion copolymer comprises, in copolymerized form, at least 90 wt. % of the one or more monoethylenically unsaturated phosphorous acid monomers in the (i) first stage.

2. The aqueous multistage emulsion copolymer composition as claimed in claim 1, wherein at least one of the (i) first stage emulsions polymer comprises, in copolymerized form, diacetone acrylamide (DAAM) or diacetone methacrylamide.

3. The aqueous multistage emulsion copolymer composition as claimed in claim 1, wherein at least one of the (ii) second stage emulsion copolymer comprises no more than 25 wt. % of the total keto group containing amide monomers used to make the aqueous multistage emulsion copolymer.

4. The aqueous multistage emulsion copolymer composition as claimed in claim 1, wherein at least one of the aqueous multistage emulsion copolymers comprises, in the (i) first stage, in copolymerized form, from 0.05 to 1.5 wt. % of one or more ethylenically unsaturated acid monomers, based on the total weight of monomers used to make the first stage.

5. The aqueous multistage emulsion copolymer composition as claimed in claim 1, wherein (b) the at least one of the one or more aqueous multistage emulsion copolymer comprises, in copolymerized form, ethyl acrylate, butyl acrylate, n-butyl methacrylate, 2-ethylhexyl acrylate, or an admixture of any of those with methyl methacrylate.

6. The aqueous multistage emulsion copolymer composition as claimed in claim 1, wherein the one or more monoethylenically unsaturated phosphorus acid monomers and salts thereof in the (i) first stage is chosen from dihydrogen phosphate-functional monomers, phosphorus acid containing (meth)acrylic acid esters, monoethylenically unsaturated phosphonate-functional monomers, and 1,2-ethylenically unsaturated (hydroxy)phosphinylalkyl (meth) acrylate monomers.

7. The aqueous multistage emulsion copolymer composition as claimed in claim 1, wherein (a) the one or more dihydrazide compound is a compound of the formula H2NHN—X—NHNH2, wherein X represents a —CO-A-CO—group, A represents a C1 to C12 alkylene group or a C6 to C12 arylene group and the"—" represents a covalent bond.

8. The aqueous multistage emulsion copolymer composition as claimed in claim 1, used as a coating composition which has a total volatile organic compound (VOC) content of 150 g/L or less.

9. A method of making aqueous multistage emulsion copolymer compositions comprising aqueous emulsion polymerizing by gradual addition in the presence of an initiator or a redox pair from 50 to 90 weight parts, based on 100 parts total monomer solids used to make the multistage emulsion copolymer, of a first monomer mixture containing from 0.5 to 3.0 wt. % of one or more monoethylenically unsaturated phosphorous acid monomers and, from 0.75 to 5 wt. % of one or more keto group containing amide monomers, and the remainder of nonionic monomers including one or more soft monomers to form (i) a first stage aqueous emulsion copolymer having a glass transition temperature (Tg) via differential scanning calorimetry (DSC) of from −50 to 30° C., and, sequentially preparing a second stage polymer by aqueous emulsion polymerizing by gradual addition in the presence of the (i) first stage aqueous emulsion copolymer and an initiator or a redox pair from 10 to 50 weight parts, based on 100 parts total monomer solids used to make the multistage emulsion copolymer, of a second monomer mixture containing one or more nonionic monomers including each of one or more soft monomers and one or more hard vinyl monomers to form an aqueous multistage emulsion copolymer having (ii) a second stage emulsion copolymer with a DSC Tg of at least 50° C. to 125° C., wherein the Tg difference between the first stage and the second stage is from 10° C. to 125° C., and wherein the weight ratio of (i) the first stage to (ii) the second stage, based on copolymer solids, ranges from 50:50 to 90:10, and, further wherein, the (ii) second stage of the aqueous multistage emulsion copolymer comprises, in copolymerized form, no more than 25 wt. % of the total monoethylenically unsaturated phosphorous acid monomers used to make the aqueous multistage emulsion copolymer, and less than 50 wt. % the total monoethylenically unsaturated phosphorous acid monomers used to make the aqueous multistage emulsion copolymer, provided that either the amount of monoethylenically unsaturated phosphorous acid in the second stage is no more than 10 wt % of the total monoethylenically unsaturated phosphorous acid monomers used to make the aqueous multistage emulsion copolymer or the amount of keto group in the second stage is less than 25 wt % the total monoethylenically unsaturated phosphorous acid monomers used to make the aqueous multistage emulsion copolymer and, then, formulating the thus formed aqueous multistage emulsion copolymer with one or more dihydrazide compounds in a total amount of from 0.5 to 4 wt. %, based on the total weight of composition solids.

10. An aqueous composition comprising aqueous multistage emulsion copolymer compositions comprising (a) one or more dihydrazide compounds in a total amount of from 0.5 to 4 wt. %, based on the total weight of composition solids, and (b) of one or more aqueous multistage emulsion copolymers containing, as (i) a first stage, an emulsion copolymer having a glass transition temperature (Tg) via differential scanning calorimetry (DSC) of from −50 to 30° C., and containing, in copolymerized form, from 0.5 to 3.0 wt. % of one or more monoethylenically unsaturated phosphorous acid monomers and, from 0.75 to 5 wt. % of one or more keto group containing amide monomers, and, as (ii) a second stage, an emulsion copolymer having a DSC Tg of from 50° C. to 125° C., wherein the Tg difference between the first stage and the second stage is from 45° C. to 150° C. having a weight ratio of (i) the first stage to (ii) the second stage, based on copolymer solids, ranging from 50:50 to 90:10 or, all monomer wt. %s based on the total weight of monomers used to make the aqueous multistage emulsion copolymer, and, further wherein, the (ii) second stage of the aqueous multistage emulsion copolymer comprises, in copolymerized form, no more than 25 wt. % of the total monoethylenically unsaturated phosphorous acid monomers used to make the aqueous multistage emulsion copolymer, and no more than 25 wt. % of the total keto group containing amide monomers used to make the aqueous multistage emulsion copolymer.

* * * * *